United States Patent [19]

Allen

[11] Patent Number: 5,124,991

[45] Date of Patent: Jun. 23, 1992

[54] ERROR CORRECTION FOR INFRARED DATA COMMUNICATION

[75] Inventor: Richard C. Allen, Los Gatos, Calif.

[73] Assignee: Photonics Corporation, Campbell, Calif.

[21] Appl. No.: 331,604

[22] Filed: Mar. 30, 1989

[51] Int. Cl.$^5$ .............................................. G08C 25/02
[52] U.S. Cl. ........................................ 371/32; 371/33; 359/154; 359/184
[58] Field of Search ..................... 371/32, 33; 455/618

[56] References Cited

U.S. PATENT DOCUMENTS

| | | | |
|---|---|---|---|
| 3,676,846 | 7/1972 | Busch | 371/33 |
| 3,979,719 | 9/1976 | Tooley et al. | 371/32 |
| 4,377,862 | 3/1983 | Koford et al. | 371/32 |
| 4,497,068 | 1/1985 | Fischer | 455/618 |
| 4,584,720 | 4/1986 | Garrett | 455/608 |
| 4,608,714 | 8/1986 | Juengel | 455/617 |
| 4,742,577 | 5/1988 | Valdmanis | 455/618 |
| 4,779,274 | 10/1988 | Takahashi et al. | 371/32 |
| 4,864,647 | 9/1989 | Harrington | 455/617 |
| 4,897,883 | 1/1990 | Harrington | 455/617 |

Primary Examiner—Jerry Smith
Assistant Examiner—Phung M. Chung
Attorney, Agent, or Firm—Limbach, Limbach & Sutton

[57] ABSTRACT

The present invention is for a method for correcting errors in received data during transmission of infrared radiation from a transmitter to a receiver without retransmitting entire packets. The method includes the steps of detecting an error in received data. A negative acknowledgement signal is transmitted from the receiver to the transmitter. A predetermined acknowledgement is transmitted by the transmitter to indicate to the receiver that the negative acknowledgement signal has been received. The data is then retransmitted.

The data is transmitted using pulse position modulation. An error is detected by either sensing two pulses within one cycle or sensing no pulses within one cycle.

The negative acknowledgement signal comprises transmitting a pulse several positions in duration. The predetermined acknowledgement by the transmitter includes purposely transmitting a cycle containing a known error.

14 Claims, 2 Drawing Sheets

=0101

ERROR CORRECTION FOR INFRARED DATA COMMUNICATION

FIELD OF THE INVENTION

This invention relates to the field of error correction. More particularly, this invention relates to the field of error correction of data transmitted via infrared medium.

BACKGROUND OF THE INVENTION

Data transmission over an infrared media in an open office environment creates the possibility for the introduction of spurious errors. A few of the causes for introduction of errors include an object passing through an infrared transmission or the jostling of an infrared transceiver during a transmission or reception. A method is needed to detect and correct such spurious errors.

SUMMARY OF THE INVENTION

The present invention is for a low overhead method for correcting errors in received data during transmission of infrared radiation from a transmitter to a receiver, without requiring retransmissions of entire data packets. The method includes the steps of detecting an error in received data. A negative acknowledgement signal is transmitted from the receiver to the transmitter. A predetermined acknowledgement is transmitted by the transmitter to indicate to the receiver that the negative acknowledgement signal has been received. The data is then retransmitted.

The data is transmitted using pulse position modulation. An error is detected by either sensing two or more pulses within one cycle or sensing no pulses within one cycle.

The negative acknowledgement signal comprises transmitting a pulse several positions in duration. The predetermined acknowledgement by the transmitter includes purposely transmitting a cycle containing a known error.

DETAILED DESCRIPTION OF THE PREFERRED EMBODIMENT

In our co-pending application INFRARED DATA COMMUNICATIONS, Ser. No. 184,261 a method and apparatus is disclosed for transmitting data over infrared radiation. In a network connecting personal computers such as the Apple Macintosh, the preferred coding technique for transmitting data over an infrared network is pulse position modulation (PPM). (Apple and Macintosh are trademarks of Apple Computer Corporation.)

Figure 1:
FIG. 1 shows a graph of cycle used during pulse position modulation.
Figure 2:
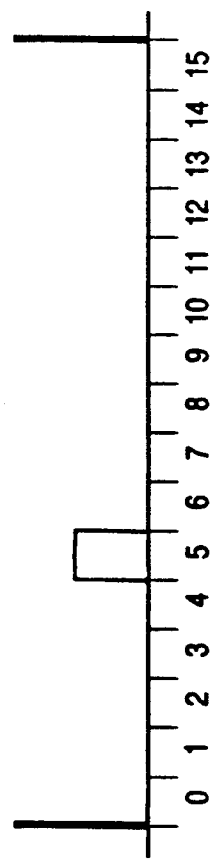
FIG. 2 shows a graph of cycle used during pulse position modulation containing a pulse.

When utilizing PPM, a pulse is transmitted in synchronized relation to a known starting point. The position of the pulse in time indicates a precise value or predetermined information code. For example, in the present invention the pulse can be transmitted into one of the known sixteen positions shown in FIG. 1. By determining which of the sixteen positions in which the pulse was transmitted, one can determine a four-bit sequence. For example, a pulse in position 5 as shown in FIG. 2 indicates that data bits 0101 have been transmitted. Each of the 16 positions indicates which of 16 binary numbers is to be selected as is known.

Figure 3:
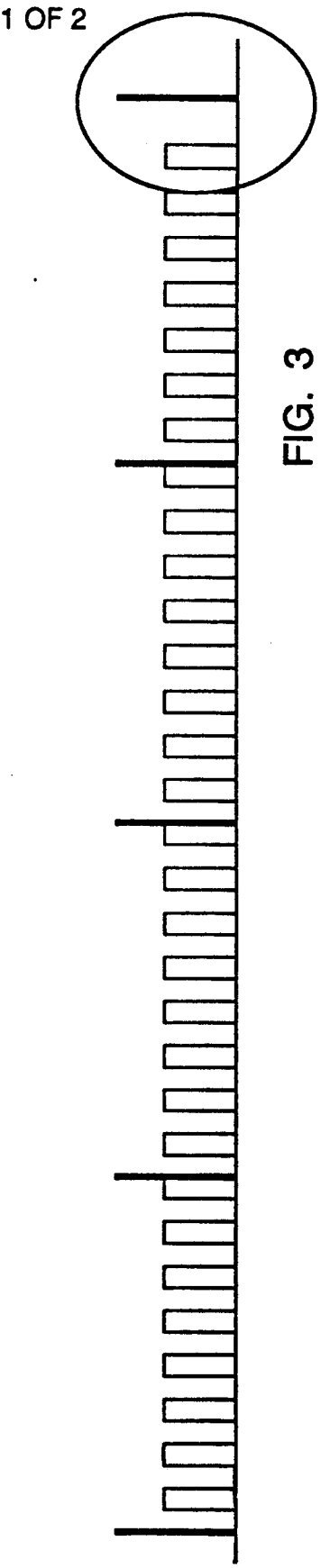
FIG. 3 shows a synchronization pulse used for data transmission.

In order to synchronize pulse position modulation sequences, four cycles of alternating pulses are transmitted. As shown in FIG. 3, the odd binary digit is used and the last pulse is omitted. The next position after the omitted pulse is the first position of synchronized data. Every packet of transmitted data begins with a synchronization burst.

Figure 4:
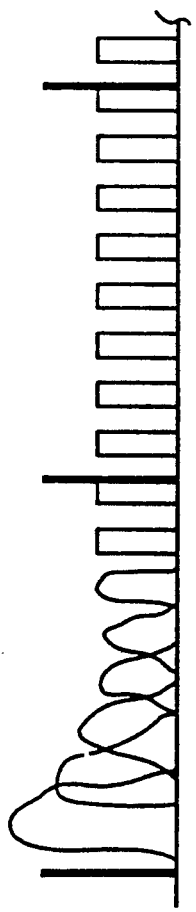
FIG. 4 shows a portion of the synchronization pulse as received.

The receiving gain for every infrared receiver in the network automatically goes to the maximum value while the network is idle. Accordingly, the first several of these synchronization burst pulses may be so large as to be indiscernible from one another. This is because the pulses are not ideal pulses. FIG. 4 shows that the autogain in each receiver reduces the received pulse to the lowest good level so that individual bits are discernible. The receiver maintains this level until the network becomes quiet again at which time the autogain control resumes maximum gain value.

There are three types of errors which can occur in data transmissions according to the present invention. If a pulse transmission cycle passes and no data pulse is received, an error has occurred. If more than one pulse is received within a pulse cycle, an error has occurred. If one pulse is dropped and a second pulse occurs within the same pulse cycle, a third type of error has occurred.

The first two types of errors are detectable according to the present invention. The third type of error is not detectable. The probability of the third type of error happening is so small as to be insignificant for most applications.

Figure 5:
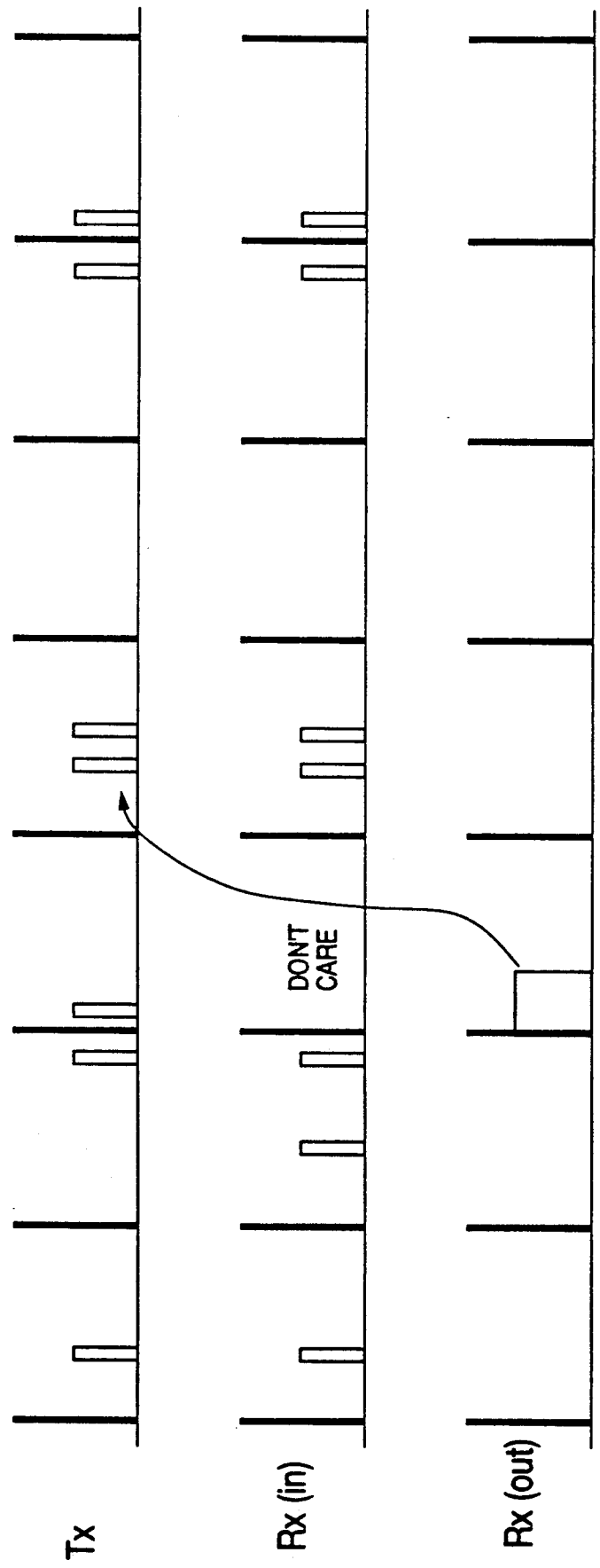
FIG. 5 shows a sample of corrected data using the present invention.

FIG. 5 shows a transmitter Tx transmitting a 5, a 13, and a 1 or the binary stream 010111010001. The stream shown to be received by the receiver Rx (in) is a 5 in the first cycle. However, a pulse 6 and pulse 13 are received in the second cycle. Because the receiver has received two pulses within a single cycle, the receiver knows that an error has been made in transmission or in reception of data. (The receiver would also know this if no pulse were received.)

Upon recognition of an error, the receiver sends a 5 pulse wide negative acknowledgement signal as shown in the receiver out waveform of FIG. 5 during the next cycle. 5 pulse widths is an arbitrary value. However, the negative acknowledgement signal must be sufficiently wide so that the transceiver can identify that it has been sent. The transmitter cannot receive or sense any signal which is being sent at the same time that the transmitter is sending a signal. By selecting a pulse that is 5 positions wide, it is assured that the transmitter will be able to sense the negative acknowledgement pulse sent out by the receiver.

The receiver disregards any data received during the cycle that it sends the negative acknowledgement pulse. As a result of the negative acknowledgement pulse sent by the receiver, the transmitter forces an error during each of the next two cycles. The fourth cycle contains two pulses and the fifth cycle contains no pulses. The sixth cycle shown in FIG. 5 contains the appropriate data retransmitted by the transmitter, i.e. a 13, and the seventh cycle contains the next intended four bits of data.

Corrections to errors in data transmission take place on the fly as shown in FIG. 5. Error correction in local area networks occur on a packet by packet basis which slows down data transmission due to retransmissions of entire packets. The minimal overhead which occurs to correct such errors cannot seriously impact the data rate. In the event that the error rate increases to the point where the data transmission rate is impacted, a buffer contained in the transmitter will hold the excess data bits until transmission can be effectively completed.

What is claimed is:

1. A method of correcting errors in received data during transmission of a stream of data transmitted in series of cycles wherein a predetermined number of bits are transmitted during a cycle from a transmitter to a receiver and further wherein the receiver does not acknowledge receiving error free data to the transmitter, the method comprising the steps of:
   a) detecting an error in a cycle of the received data;
   b) transmitting a negative acknowledgement signal from the receiver to the transmitter during the next cycle;
   c) transmitting a predetermined acknowledgement by the transmitter to the receiver that the negative acknowledgement signal has been received, and
   d) retransmitting the data from the transmitter to the receiver beginning with the cycle during which the error occurred.

2. The method according to claim 1 wherein the data is transmitted via infrared radiation.

3. The method according to claim 2 wherein the data is transmitted using pulse position modulation.

4. The method according to claim 3 wherein the step of detecting errors comprises sensing more than one pulse within one cycle.

5. The method according to claim 3 wherein the step of detecting errors comprises sensing no pulses within one cycle.

6. The method according to claim 2 wherein the step of transmitting a negative acknowledgement comprises transmitting a pulse several positions in duration.

7. The method according to claim 2 wherein the step of transmitting a predetermined acknowledgement by the transmitter to the receiver that the negative acknowledgement signal has been received includes purposely transmitting a cycle containing a known error.

8. A method of the type for correcting errors in received data during transmission from a transmitter to a receiver wherein the data is transmitted in a packet of bytes and further whereby the receiver need not transmit an acknowledge signal with each correctly received byte or packet, the method comprising the steps of:
   a) detecting an error in received data in a byte of the packet;
   e) transmitting a negative acknowledgement signal from the receiver to the transmitter;
   f) transmitting a predetermined acknowledgement by the transmitter to the receiver that the negative acknowledgement signal has been received, and
   g) retransmitting the data, whereby the error is corrected without retransmitting the entire packet.

9. The method according to claim 8 wherein the data is transmitted via infrared radiation.

10. The method according to claim 9 wherein the data is transmitted using pulse position modulation.

11. The method according to claim 10 wherein the step of detecting errors comprises sensing more than one pulse within one cycle.

12. The method according to claim 10 wherein the step of detecting errors comprises sensing no pulses within one cycle.

13. The method according to claim 9 wherein the step of transmitting a negative acknowledgement comprises transmitting a pulse several positions in duration.

14. The method according to claim 9 wherein the step of transmitting a predetermined acknowledgement by the transmitter to the receiver that the negative acknowledgement signal has been received includes purposely transmitting a cycle containing a known error.

* * * * *